(12) United States Patent
Pal et al.

(10) Patent No.: US 12,088,089 B2
(45) Date of Patent: Sep. 10, 2024

(54) NUISANCE TRIP DECISION MANAGEMENT USING DATA ANALYTICS IN ELECTRICAL PROTECTION SYSTEM

(71) Applicant: ABB Schweiz AG, Baden (CH)

(72) Inventors: Mayukha Pal, Sangareddy (IN); Alok Kumar Bharati, Davangere (IN); Satish Shamsundar Belkhode, Wardha (IN)

(73) Assignee: ABB Schweiz AG, Baden (CH)

( * ) Notice: Subject to any disclaimer, the term of this patent is extended or adjusted under 35 U.S.C. 154(b) by 400 days.

(21) Appl. No.: 17/518,758

(22) Filed: Nov. 4, 2021

(65) Prior Publication Data

US 2022/0140597 A1    May 5, 2022

(30) Foreign Application Priority Data

Nov. 4, 2020   (IN) .............................. 202041048167

(51) Int. Cl.
| | |
|---|---|
| *G05B 19/042* | (2006.01) |
| *G01D 21/02* | (2006.01) |
| *G05B 13/02* | (2006.01) |
| *H02H 1/00* | (2006.01) |
| *H02H 7/26* | (2006.01) |

(52) U.S. Cl.
CPC .............. *H02H 7/26* (2013.01); *G01D 21/02* (2013.01); *G05B 13/0265* (2013.01); *G05B 19/0428* (2013.01); *H02H 1/0007* (2013.01); *H02H 1/0092* (2013.01); *G05B 2219/25257* (2013.01)

(58) Field of Classification Search
None
See application file for complete search history.

(56) References Cited

U.S. PATENT DOCUMENTS

| | | | | |
|---|---|---|---|---|
| 8,023,235 | B2* | 9/2011 | Bilac ........................ | H02H 3/33 361/42 |
| 8,675,325 | B2* | 3/2014 | Beierschmitt ........ | H01H 71/123 361/78 |
| 8,988,175 | B2* | 3/2015 | Cieply ................... | H01H 89/06 335/16 |
| 9,347,978 | B2* | 5/2016 | Kolker ................... | G01R 31/52 |
| 9,470,735 | B2* | 10/2016 | Hiraga ............... | G01R 31/2612 |
| 9,557,723 | B2* | 1/2017 | Nasle ................. | G06Q 30/0206 |
| 9,659,721 | B1* | 5/2017 | Sastry ...................... | H02H 3/44 |
| 9,709,626 | B2* | 7/2017 | Ostrovsky .......... | G01R 31/2884 |

(Continued)

*Primary Examiner* — Jason Lin
(74) *Attorney, Agent, or Firm* — Leydig, Voit & Mayer, Ltd.

(57) ABSTRACT

A system and method for nuisance-trip decision management in an electric power system using data analytics comprising, a protection system, PS, and at least one electrical protection circuit, EPC. The PS comprising, a plurality of sensors configured to measure data; a memory configured to store an updated data of nuisance-trip events and a plurality of nuisance-trip parameters detected or generated on the electric power system over a period; a processor configured to perform hybrid machine learning (HML) based on the measured data from the plurality of sensors for a nuisance-trip condition and communicate with a neighboring PS; a protection microcontroller configured to allow or avoid tripping at least one electronic tripping circuit provided in the at least one EPC by communicating with the processor and the neighboring PS.

10 Claims, 9 Drawing Sheets

(56) References Cited

U.S. PATENT DOCUMENTS

| | | | |
|---|---|---|---|
| 9,759,758 B2* | 9/2017 | Ostrovsky | G01R 31/50 |
| 9,989,568 B2* | 6/2018 | May | G01R 22/061 |
| 10,020,649 B2* | 7/2018 | Du | H02H 3/335 |
| 10,539,618 B2* | 1/2020 | Yang | G01R 31/3274 |
| 10,712,372 B2* | 7/2020 | Grumel | H02H 3/08 |
| 11,175,349 B2* | 11/2021 | Bhalwankar | H02H 7/12 |
| 11,270,854 B2* | 3/2022 | Manahan | H05K 7/20 |
| 11,303,111 B2* | 4/2022 | Butler | H01H 9/042 |
| 11,500,007 B2* | 11/2022 | Denney | G01R 31/1209 |
| 11,742,868 B1* | 8/2023 | Becker | H03M 1/0617 |
| | | | 341/118 |

* cited by examiner

NUISANCE TRIP DECISION MANAGEMENT USING DATA ANALYTICS IN ELECTRICAL PROTECTION SYSTEM

CROSS-REFERENCE TO RELATED APPLICATIONS

The present application claims priority to co-pending Indian Patent Application Ser. No. 202041048167, filed on Nov. 4, 2020, which is fully incorporated herein by reference in its entirety by reference for all purposes.

FIELD OF THE INVENTION

The embodiment herein generally relates to nuisance-tripping decision management in protection systems. Particularly, the present invention provides a system and method for nuisance-trip decision management using data analytics in an electrical protection system.

BACKGROUND AND PRIOR ART

In general, protection systems (PS) are used to protect the electrical components as well as operators and environment safety. In the PS installations, there are instances that may pick-up interference signals, which may lead to tripping of an electronic tripping circuit (ETC). Although there is no significant occurrence of a fault, an unwanted/nuisance tripping of the ETC may cause disturbance/financial loss to the customers/operators. The interference signals may include but are not limited to current or voltage surges, inrush currents, noise signals due to ambient conditions (e.g. vibrations, temperature etc.), electro-magnetic interference from a plurality of communication devices and so on.

In many cases, these nuisance trips may create an inconvenience to the customer or undermine critical true safety events. Conventionally, filters are used to check the injected noises to make decisions accordingly on tripping the electrical circuits. Those filters are designed based on laboratory testing results and cannot be adapted to environmental changes. In some countries, ground fault and arc-fault circuit interrupters are installed for each area/room of a commercial/residential building to avoid the nuisance tripping and to detect a fault location in case of any occurrences of the fault. However, it is very difficult to find a cause of such nuisance tripping in the industrial buildings in a short period.

For instance, the cause for the nuisance tripping may be due to over current, voltage, frequency, a ground fault and so on. An arc-fault is one of the causes in nuisance tripping. The cause for the arc-fault may be series arc-fault or parallel arc-fault. In both the cases, the ETC may not be aware of a change in load in the PS and the interference signals that are affecting the PS. When considering the ground fault, the cause for the ground fault may be due to worn insulation, conductive dusts, water, or other interference signals and more than 80% of equipment short circuits are due to ground fault. The ground faults are detected based on a ground fault sum (i.e. vectorial sum of the phase and neutral currents in any distribution circuit is non-zero, if ground fault exists), differential ground fault, Multi-Source Ground-Fault (MSGF) and High Resistance Ground Fault (HRGF). The nuisance tripping may happen, when the interference signal is pick-up by the ETC and predicted as a ground fault. Another cause for nuisance tripping is power-reversal in substations, rooftop solar photovoltaics or Wind power station.

There are systems such as ZSI, RELT etc. that are used to enhance the selective coordination level of electrical distribution systems and manage tripping of ETC. Whereas under a nuisance trip condition, an adaptation of the ZSI does not allow coordination of an upstream breaker and downstream breakers. In case of RELT, it is challenging to manage a tripping-decision in the ETC, based on the causes of the faults using a conventional interrupters and filters. Generally, data such as historical trip data, signatures of events, sensor data, historical events, load characteristics, noise level, non-electrical parameter data such as temperature, vibrations, humidity and so on are not analyzed in making decisions before isolating an electrical circuit. This can lead to significantly higher nuisance-tripping of the PS under abnormal ambient conditions or abnormal coordination of the PS.

Therefore, there is a need for a system and method for nuisance-tripping decision management in the PS integrated with a hybrid machine-learning model (HMLM) thereby to make decisions based on a real-time data and to learn nuisance trip events and its environmental conditions for isolating noise parameters and adapting to ignore them.

SUMMARY OF THE INVENTION

It is an object of the present disclosure to mitigate, alleviate or eliminate one or more of the above-identified deficiencies and disadvantages in the prior art and solve at least the above-mentioned problem.

In view of the foregoing, an embodiment herein provides a first aspect of a system for nuisance-trip decision management in an electric power system using data analytics comprising, a protection system, PS, at least one electrical protection circuit, EPC, and a neighboring protection system. The PS comprising a memory, a processor, a plurality of sensors and a protection microcontroller. The plurality of sensors is configured to measure/sense data from a plurality of non-electrical parameters and electrical parameters sensors. The measured data includes a plurality of non-electrical parameters and electrical parameters that include but is not limited to ambient temperature, vibrations, electromagnetic interference (EMI) signal, a plurality of voltage and current waveforms. The memory is configured to store an updated data of nuisance-trip events and a plurality of nuisance-trip parameters detected or generated on the electric power system over a period for making tripping decision.

According to a first aspect of an embodiment, the processor is configured to perform hybrid machine learning based on the measured data from the plurality of sensors for a nuisance-trip condition and communicate with a neighboring protection system through LAN, central server/cloud via a communication interface-1. The protection microcontroller is configured to use the measured data from the plurality of electrical parameter sensors to identify an electrical fault. The protection micro-controller is further configured to intelligently allow or avoid tripping at least one electronic tripping circuit provided in the at least one electronic protection circuit by communicating with the at least one electronic protection circuit, the processor and the neighboring protection systems through the LAN or the central server via a communication interface-2. The processor is further configured to collect the measured data from the plurality of sensors. The processor is further configured to generate a nuisance-trip parameter for a plurality of protection functions, at a hybrid machine learning model (HMLM) provided in the processor, based on the measured data using weighted output parameters thereby to identify the nuisance-trip condition that is mapped with a predefined list of a training data stored in the memory. The training data is updated to be utilized by the physics aware reinforced learning for field calibration. The plurality of protection functions includes but are not limited to a ground fault, an over current, a voltage, a frequency, an arc-fault, a zone selective interlock, ZSI, a Reduced Energy Let Through, RELT, and a Power Reversal, PR.

According to a first aspect of an embodiment, the processor is further configured to communicate the generated nuisance-trip parameter to the protection microcontroller for an intelligent nuisance-trip decision making via the communication interface-1. The protection microcontroller is further configured to receive the generated nuisance-trip parameter from the processor. The protection microcontroller is further configured to compare the received nuisance-trip parameter with a stored nuisance-trip parameter of the plurality of protection functions to identify the nuisance-trip condition and decide to: allow tripping an electronic tripping circuit of the PS, if a valid trip condition of the ETC is identified. The protection microcontroller is further configured to decide to avoid tripping the ETC of the PS, if a confirmed nuisance-trip condition of the ETC is identified and allow tripping the ETC of the PS, if an unconfirmed nuisance-trip condition of the ETC is identified. The protection microcontroller is further configured to simultaneously request a user feedback to validate the unconfirmed nuisance-trip condition by receiving a confirmation from the user to allow or avoid tripping the ETC and update the weighted output parameters of the HMLM by reinforced machine learning, based on the confirmation from the user to implement a tripping decision in future.

According to a first aspect of an embodiment, the protection microcontroller is further configured to request the weighted output parameters for the generated nuisance-trip parameter, from the neighboring protection systems through the LAN, or any communication interface or the central server. The protection microcontroller is further configured to utilize an updated and deployed decision-making firmware or the weighted output parameters to calibrate the HMLM of the processor thereby to make a future tripping decisions in the PS.

According to a first aspect of an embodiment, the protection microcontroller is further configured to compare the received nuisance-trip parameter with the stored nuisance-trip parameter related to an over current protection function by correlating the received nuisance-trip parameters with a thermal data to identify the nuisance-trip condition. The over current protection function includes Long-Term and Short-Term over current. The protection microcontroller is further configured to decide whether to allow or avoid tripping the ETC based on the comparison of the received nuisance-trip parameters and update the weighted output parameters of the HMLM by a reinforced machine learning accordingly to implement the tripping decision in future.

According to a first aspect of an embodiment, the protection microcontroller is further configured to compare the received nuisance-trip parameter with the stored nuisance-trip parameter related to a voltage and frequency protection function, by correlating the received nuisance-trip parameters with a per-unit (pu) value of a change in voltage and a synchronous frequency value of the neighboring PSs that are connected with the protection system thereby to identify the nuisance-trip condition. The voltage protection function includes under-voltage, over-voltage and phase loss of the PS and the frequency protection function includes under frequency and over frequency. The protection microcontroller is further configured to decide whether to allow or avoid tripping the electronic tripping circuit based on the comparison of the received nuisance-trip parameters; and update the weighted output parameters of the HMLM by a reinforced machine learning accordingly to implement the tripping decision in future.

According to a first aspect of an embodiment, the protection microcontroller is further configured to compare the received nuisance-trip parameter with the stored nuisance-trip parameter related to a ground fault protection function by sensing and categorizing events of the ground fault, GF, both in human and equipment protection, to identify the nuisance-trip condition. The GF protection function includes but is not limited to GF Sum, differential GF protection, Multi-Source Ground-Fault, MSGF, and High Resistance Ground Fault, HRGF. The protection microcontroller is further configured to decide whether to allow or avoid tripping the electronic tripping circuit based on the comparison of the received nuisance-trip parameters; and update the weighted output parameters of the HMLM by a reinforced machine learning accordingly to implement the tripping decision in future.

According to a first aspect of an embodiment, the protection microcontroller is further configured to compare the received nuisance-trip parameter with the stored nuisance-trip parameter related to an arc-fault protection function by comparing the received nuisance-trip parameters with a load characterization and a load identification on each of the protection system, to identify the nuisance-trip condition. The arc-fault protection function includes series arc-faults and parallel arc-faults. The protection microcontroller is further configured to decide whether to allow or avoid tripping the ETC based on the comparison of the received nuisance-trip parameters; and update the weighted output parameters of the HMLM by a reinforced machine learning accordingly to implement the tripping decision in future.

According to a first aspect of an embodiment, the protection microcontroller is further configured to manage the tripping decisions by identifying hierarchical location of fault/nuisance-trip through a ZSI feature. The ZSI protection function includes but is not limited to communication of a component failure to upstream or downstream PS. The protection microcontroller is further configured to decide whether to allow or avoid tripping the ETC at an appropriate location of the electric power system by selectively coordinating a plurality of upstream and downstream circuit breakers in the electric power system based on the comparison of the received nuisance-trip parameters.

According to a first aspect of an embodiment, the protection microcontroller is further configured to compare the received nuisance-trip parameter with the stored nuisance-trip parameter related to a RELT protection function by characterizing EMI sources and a proximity of the EMI sources with the received nuisance-trip parameters of the protection system, to identify the nuisance-trip condition. The RELT protection function includes but is not limited to the neighboring protection system under RELT and human detection through EMI source characterization. The protection microcontroller is further configured to decide whether to allow tripping the ETC or to activate a RELT mode of operation in the protection microcontroller, based on the comparison of the received nuisance-trip parameters; and update the weighted output parameters of the HMLM by a reinforced machine learning accordingly to implement the tripping decision in future.

According to a first aspect of an embodiment, the protection microcontroller further configured to collect a distributed energy resource (DER) meter data from the neighboring PS. The protection microcontroller further configured to compare the received nuisance-trip parameter with the stored nuisance-trip parameter related to a power-reversal protection function by detecting a change in direction of a power flow in the DER meter data and coordinating the DER meter data and the collected DER meter data from the neighboring PS with the received nuisance-trip parameters of the protection system, to identify the nuisance-trip condition. The power-reversal (PR) protection function includes but are not limited to DER operation and other fault conditions. The protection microcontroller is further configured to decide whether to allow or avoid tripping the ETC based on the comparison of the received nuisance-trip parameters; and update the weighted output parameters of the HMLM by a reinforced machine learning accordingly to implement the tripping decision in future.

According to a second aspect of an embodiment, a method for nuisance-trip decision management in an electrical power system using data analytics comprising steps of, storing, in a memory, an updated data of nuisance-tripping events and a plurality of nuisance-trip parameters detected or generated on the electric power system over a period. The method further comprising the steps of performing, at a processor, hybrid machine learning based on the measured data from a plurality of sensors for a nuisance-trip condition and communicating with a neighboring protection system through LAN, central server/cloud via a communication interface.

According to a second aspect of an embodiment, the method further comprising collecting, by the processor, a measured data from a plurality of sensors that includes a plurality of non-electrical parameters and electrical parameters sensors. The measured data includes a plurality of non-electrical parameters and electrical parameters. The plurality of non-electrical parameters and electrical parameters include but is not limited to ambient temperature, vibrations, electromagnetic interference signal, voltage and current waveforms. The method further comprising the steps of generating, by the processor, a nuisance-trip parameter for a plurality of protection functions at a hybrid machine learning model (HMLM) provided in the processor based on the measured data using weighted output parameters thereby to identify the nuisance-trip condition that is mapped with a predefined list of a training data stored in the memory. The training data is updated to be utilized using a physics aware Reinforced learning for Field Calibration. The plurality of protection functions includes a ground fault, an over current, a voltage, a frequency, an arc-fault, a zone selective interlock, ZSI, a Reduced Energy Let Through, RELT, and a Power reversal.

According to a second aspect of an embodiment, the method further comprising the steps of communicating, by the processor, the generated nuisance-trip parameter to a protection microcontroller for allowing or avoiding tripping at least one electronic tripping circuit provided in at least one electronic protection circuit via the communication interface. The method further comprising the steps of receiving, by the protection microcontroller, the generated nuisance-trip parameter from the processor. The method further comprising the steps of comparing, by the protection microcontroller, the received nuisance-trip parameter with a stored nuisance-trip parameter of the plurality of protection functions to identify the nuisance-trip condition.

According to a second aspect of an embodiment, the method further comprising the steps of deciding to: allow tripping the at least one ETC of the of the at least one EPC, if a valid trip condition of the at least one ETC is identified; avoid tripping the at least one ETC of the at least one EPC, if a confirmed nuisance-tripping condition of the at least one ETC is identified; and allow tripping the at least one ETC of the at least one EPC, if an unconfirmed nuisance-trip condition of the at least one ETC is identified. The method further comprising the steps of simultaneously requesting a user feedback for validating the unconfirmed nuisance-trip condition by: receiving a confirmation from the user to allow or avoid tripping the at least one ETC and updating the weighted output parameters of the HMLM by reinforced machine learning, based on the confirmation from the user to implement a tripping decision in future.

Effects and features of the second aspect are to a large extent analogous to those described above in connection with the first aspect. Embodiments mentioned in relation to the first aspect are largely compatible with the second aspect.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

The present disclosure will become apparent from the detailed description given below. These and other aspects of the embodiments and other objects and advantages of the present invention herein will be better appreciated and understood when considered in conjunction with the following description and the accompanying drawings. The accompanying drawings are incorporated for illustration of preferred embodiments of the present invention and are not intended to limit the scope thereof. It should be understood, however, that the following descriptions, while indicating preferred embodiments and numerous specific details thereof, are given by way of illustration and not of limitation. Different configuration changes and modifications may be made within the scope of the embodiments herein without departing from the spirit thereof, and the embodiments herein include all such modifications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE PREFERRED EMBODIMENTS

Figure 1:
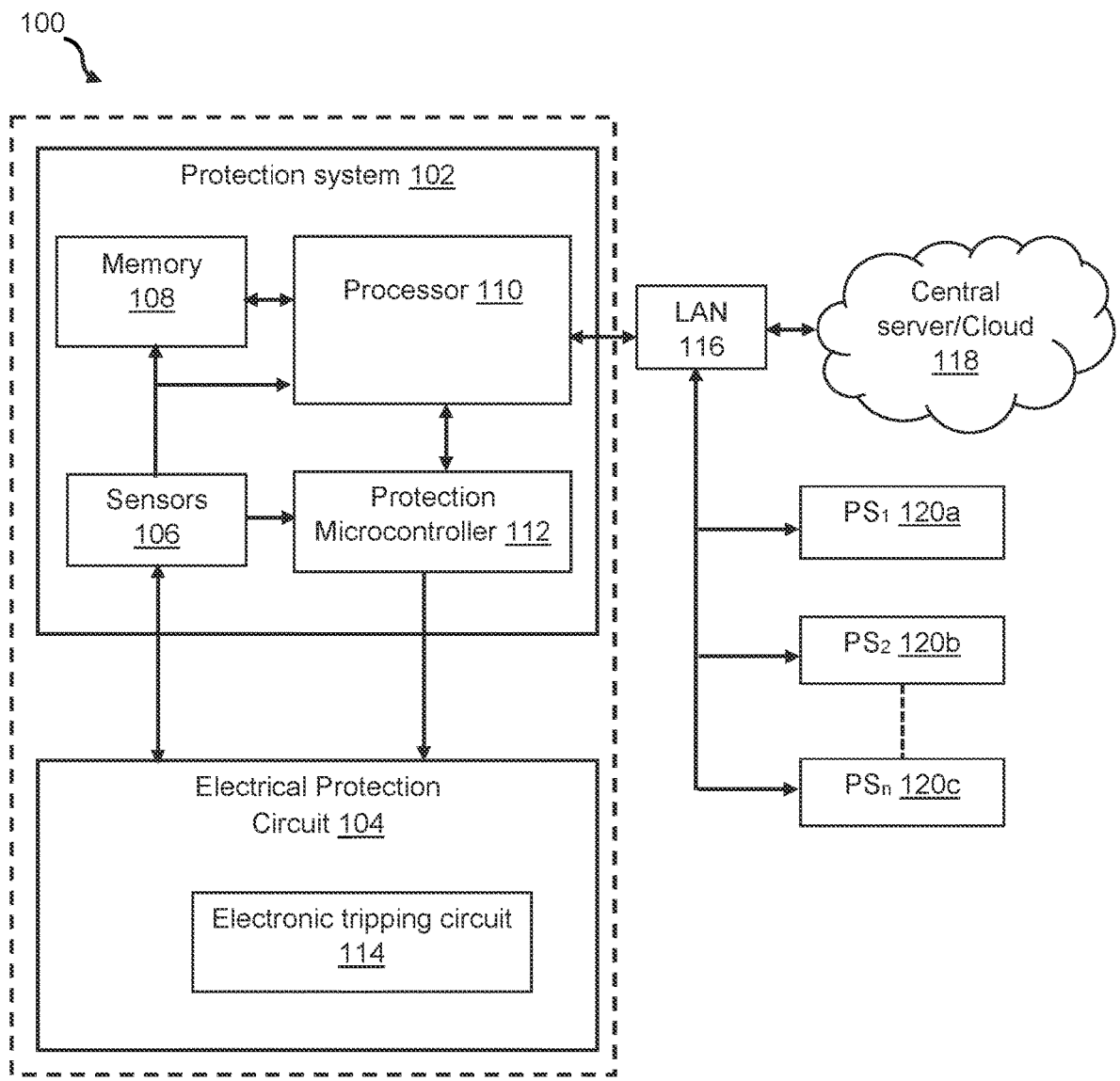
FIG. 1 illustrates an exemplary system for managing nuisance-trip decisions in an electric power distribution system, according to a first aspect of an embodiment herein.

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need for a system and a method for nuisance-trip decision management in an electric power distribution system using data analytics. The embodiments herein achieve this by providing a protection system for nuisance-trip decision management integrated with a hybrid machine-learning model (HMLM) in an electric power distribution system using a supervised or unsupervised learning from a cloud or other neighboring devices that are connected in a mesh network along with a real time data. Referring now to the drawings, and more particularly to FIGS. 1 through 9, where similar reference characters denote corresponding features consistently throughout the figures, there are shown preferred embodiments.

FIG. 1 illustrates an exemplary system (100) for managing nuisance-trip decisions in an electric power distribution system, according to a first aspect of an embodiment. The system for managing nuisance-trip decisions in the electric power system comprising, a protection system, PS, (102), at least one electrical protection circuits, EPC, (104), a cloud/central server (118), a local area network, LAN, (116) and a plurality of neighboring protection systems (120a, 120b, 120c). The PS (102) is further connected to the neighboring protection systems (120a, 120b, 120c) through LAN or central server/cloud (118). The PS includes but is not limited to a memory (108), a processor (110), a plurality of sensors (106), and a protection microcontroller (112). The plurality of sensors (106) and the protection microcontroller (112) are connected to the at least one EPC (104) of the electric power system. The at least one EPC (104) are connected to the at least one electrical tripping circuit, ETC, (114) for activating at least one actuator to trip/disconnect a fault location/area in the electric power system. The electric power system includes but is not limited to residential, commercial and industrial electric power system. The processor (110) is configured to perform hybrid machine learning (HTML) based on the measured data from the plurality of sensors for a nuisance-trip condition and communicate with the neighboring protection system (220a, 220b,220c).

Figure 2:
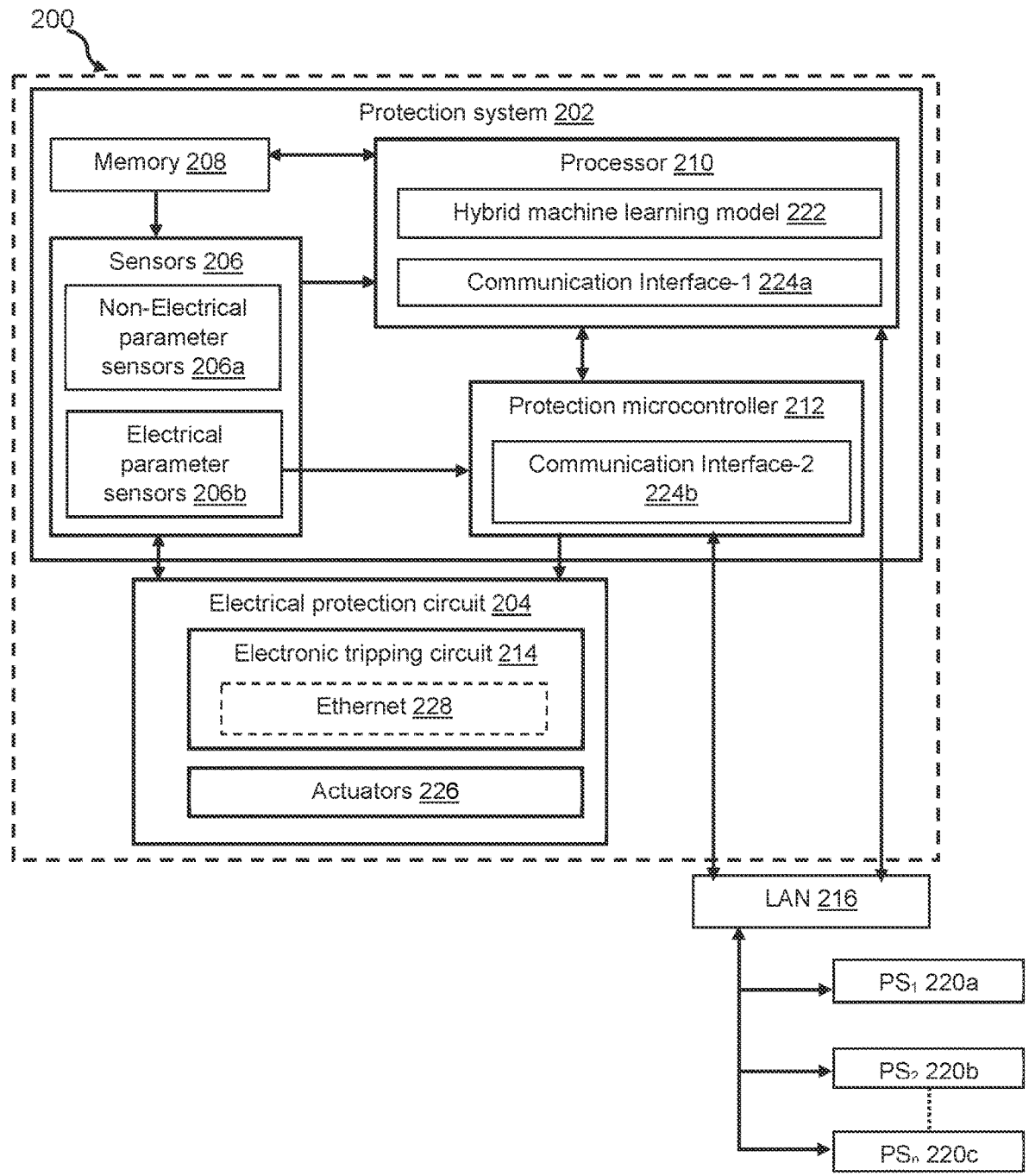
FIG. 2 illustrates a system for nuisance-trip decision management in an electric power system using data analytics, according to a first aspect of an embodiment herein.

FIG. 2 illustrates a system (200) for nuisance-trip decision management in an electric power system using data analytics, according to a first aspect of an embodiment. The system (200) for nuisance-trip decision management in the electric power system using data analytics comprising, a protection system, PS, (202), and at least one electrical protection circuit, EPC, (204). The PS (202) comprising, a plurality of sensors (206), a memory (208), a processor (210), and a protection microcontroller (212). The plurality of sensors (206) is configured to measure/sense data that includes a plurality of non-electrical parameters and electrical parameters. The plurality of sensors (206) includes electrical (206b) and non-electrical (206a) parameter sensors. The plurality of electrical parameters and non-electrical parameters include but is not limited to ambient bus-bar temperatures, ambient electromagnetic interference, EMI, signal, voltage and current waveforms, device ID, phase current, phase voltage, power-factor, accelerometer data, vibrations recorded, ambient environmental temperature, level of humidity near the electrical tripping circuits, geographical location, arc signatures, load characteristics, building characteristics, nuisance trip and trip or no-trip or pick-up or drop out signals.

According to a first aspect of an embodiment, the memory (208) is configured to store an updated data of nuisance-trip events and a plurality of nuisance-trip parameters detected or generated on the electric power system over a period for making tripping decision. The processor (210) is configured to perform hybrid machine learning (HML) based on the measured data from the plurality of sensors for a nuisance-trip condition and communicate with a neighboring protection system (220a, 220b,220c) through LAN, central server/cloud (not shown in the FIG. 2) via a communication interface-1 (224a). The plurality of the sensors can be either located in the ETC or in an environment where switchgears are installed. The measurement of data from the sensors can be from the EPC or from the environment where switchgears are installed. The protection microcontroller (212) is configured to use the measured data from the plurality of electrical parameter sensors to identify an electrical fault. The protection micro-controller is further configured to intelligently allow or avoid tripping at least one electronic tripping circuit (214) provided in at least one electronic protection circuit by communicating with the at least one electronic protection circuit (204), the processor (210) and the neighboring protection systems (220a,220b,220c) through the LAN (216) or the central server (118) via a communication interface-2 (224b). The electronics tripping circuit (214) is enabled with an Ethernet (228) communication capability. The electronics tripping circuit includes actuator (226) for activating the tripping of the electrical power system/circuit.

According to a first aspect of an embodiment, the processor (210) is further configured to collect the measured data from the plurality of sensors (206). The processor (210) is further configured to generate a nuisance-trip parameter for a plurality of protection functions at a hybrid machine learning model HMLM (222) provided in the processor (210) based on the measured data using weighted output parameters thereby to identify the nuisance-trip condition that is mapped with a predefined list of a training data stored in the memory (208). The training data is updated to be utilized by a physics aware reinforced machine learning for field calibration. The field calibration is a process that is continuously happening in a field/environment/location of the electric protection circuits to take into account a change in ambient operating conditions and components wear and tear. This accounting for the ambient operating conditions and wear and tear is performed through physics aware reinforced ML. Further, the training data is updated to be utilized for performing self-calibration of HMLM using physics aware reinforced machine learning based on the electronic, and mechanical component wear of the protection system (PS) (also related to the life of the PS) for automatic field calibration to ensure accurate calculation/generation of the nuisance trip parameters. The plurality of protection functions includes but are not limited to a ground fault, an over current, a voltage, a frequency, an arc fault, a zone selective interlock, ZSI, a Reduced Energy Let Through, RELT, and a Power reversal.

According to a first aspect of an embodiment, the HMLM utilizes the real-time data as augmented data for deep learning. The processor (210) is configured to calibrate the HMLM to minimize the error and update a decision-making firmware or weighted output parameters of the PS, from the calibrated HMLM to develop a new decision making firmware or the weighted output parameters. In an initial stage of decision making event occurrence, clustering techniques are adapted for grouping and classification to make the system to learn. As more data and decision events gathered, the electrical power system/circuit/network of protection devices get trained through regression methodologies for learning and in turn prepares it as an adaptive protection system for decision-making. With each step of decision-making, error percentage (%) is calculated (using a cost function) for improvement in accuracy of learning and decision making. This leads to a progressive, smarter and faster optimized learning method for the network. After sufficient learning in the system with reduced error the ML method uses data nodes as neurons of the network for optimized forecasting of the data/parameters that allows a decision forecast on protection with improved efficiency.

According to a first aspect of an embodiment, the processor (210) is further configured to communicate the generated nuisance-trip parameter to the protection microcontroller (212) for an intelligent nuisance-trip decision making via the communication interface-1 (224a). The protection microcontroller (212) is further configured to receive the generated nuisance-trip parameter from the processor (210). The protection microcontroller (212) is further configured to compare the received nuisance-trip parameter with a stored nuisance-trip parameter of the plurality of protection functions to identify the nuisance-trip condition. The protection microcontroller (212) is further configured use the measured data from the plurality of electrical parameter sensors to identify an electrical fault. The protection micro-controller is further configured to intelligently decide by allowing tripping an electronic tripping circuit ETC (214) of the at least one EPC (204), if a valid trip condition of the ETC is identified; avoiding tripping the ETC (214) of the at least one EPC (204), if a confirmed nuisance-trip condition of the ETC (214) is identified; and allowing tripping the ETC (214) of the at least one EPC (204), if an unconfirmed nuisance-trip condition of the ETC (214) is identified. The protection microcontroller (212) is further configured to simultaneously request a user feedback to validate the unconfirmed nuisance-trip condition by receiving a confirmation from the user to allow or avoid tripping the ETC (214). The protection microcontroller (212) is further configured to update the weighted output parameters of the HMLM (222) by reinforced machine learning, based on the confirmation from the user to implement a tripping decision in future. That is, if a new device or trip condition identified, then trip the ETC. When there is an identification of reoccurred new device or the trip condition, then based on learning and updating the nuisance-trip events the tripping decision is managed efficiently in future.

According to a first aspect of an embodiment, the protection microcontroller (212) further configured to request the weighted output parameters for the generated nuisance-trip parameter, from the neighboring protection systems (220a, 220b, 220c) through the LAN (216), or any communication interface or the central server (118). The protection microcontroller (212) further configured to utilize an updated and deployed decision-making firmware or the weighted output parameters to calibrate the HMLM (222) of the processor (210) thereby to make the tripping decisions in the PS (202) in future.

According to a first aspect of an embodiment, the protection microcontroller (212) further configured to compare the received nuisance-trip parameter with the stored nuisance-trip parameter related to an over current protection function by correlating the received nuisance-trip parameters with a thermal data to identify the nuisance-trip condition. The over current protection function includes but is not limited to Long-Term and Short-Term over current. The protection microcontroller (212) further configured to decide whether to allow (416b) or avoid (416a) tripping the ETC (214) based on the comparison of the received nuisance-trip parameters and update the weighted output parameters of the HMLM (222) by a reinforced machine learning accordingly to implement the tripping decision in future.

According to a first aspect of an embodiment, the protection microcontroller (212) further configured to compare the received nuisance-trip parameter with the stored nuisance-trip parameter related to a voltage and frequency protection function, by correlating the received nuisance-trip parameters with a per unit value of a change in voltage and a synchronous frequency value of the neighboring PSs that are connected with the protection system thereby to identify the nuisance-trip condition. The voltage protection function includes but is not limited to under-voltage, over-voltage and phase loss of the PS (202). The frequency protection function includes under frequency and over frequency. The protection microcontroller (212) further configured to decide whether to allow or avoid tripping the electronic tripping circuit based on the comparison of the received nuisance-trip parameters; and update the weighted output parameters of the HMLM (222) by a reinforced machine learning accordingly to implement the tripping decision in future.

According to a first aspect of an embodiment, the protection microcontroller (212) further configured to compare the received nuisance-trip parameter with the stored nuisance-trip parameter related to a ground fault, GF, protection function by sensing and categorizing events of the GF both in human and equipment protection, to identify the nuisance-trip condition. The GF protection function includes but is not limited to GF Sum, differential GF protection, Multi-Source Ground-Fault, MSGF, and High Resistance Ground Fault, HRGF. The protection microcontroller (212) further configured to decide whether to allow (516b) or avoid (516a) tripping the ETC based on the comparison of the received nuisance-trip parameters and update the weighted output parameters of the HMLM (222) by a reinforced machine learning accordingly to implement the tripping decision in future.

According to a first aspect of an embodiment, the protection microcontroller (212) further configured to compare the received nuisance-trip parameter with the stored nuisance-trip parameter related to an arc-fault protection function by comparing the received nuisance-trip parameters with a load characterization and a load identification on each of the protection system, to identify the nuisance-trip condition. The arc-fault protection function includes but is not limited to series arc faults and parallel arc faults. The protection microcontroller (212) further configured to decide whether to allow or avoid tripping the ETC (214) based on the comparison of the received nuisance-trip parameters and update the weighted output parameters of the HMLM (222) by a reinforced machine learning accordingly to implement the tripping decision in future.

According to a first aspect of an embodiment, the protection microcontroller (212) further configured to manage the tripping decisions by identifying a hierarchical location of fault/nuisance-trip through a ZSI feature along with the received nuisance trip parameter. The ZSI protection function includes but is not limited to communication of a component failure to upstream or downstream Protection System. The protection microcontroller (212) further configured to decide whether to allow or avoid tripping the ETC (214) at an appropriate location of the electric power system by selectively coordinating a plurality of upstream and downstream circuit breakers in the electric power system based on the comparison of the received nuisance-trip parameters.

According to a first aspect of an embodiment, the protection microcontroller (212) further configured to compare the received nuisance-trip parameter with the stored nuisance-trip parameter related to a RELT protection function by characterizing EMI sources and a proximity of the EMI sources with the received nuisance-trip parameters of the protection system, to identify the nuisance-trip condition. The RELT protection function includes but is not limited to the neighboring protection system under RELT and human detection through EMI source characterization. The protection microcontroller (212) further configured to decide whether to allow tripping the ETC (214) or to activate a RELT mode of operation in the protection microcontroller (212), based on the comparison of the received nuisance-trip parameters. The protection microcontroller (212) further configured to update the weighted output parameters of the HMLM (222) by a reinforced machine learning accordingly to implement the tripping decision in future.

According to a first aspect of an embodiment, the protection microcontroller (212) further configured to collect a distributed energy resource (DER) meter data from the neighboring PS. The protection microcontroller (212) further configured to compare the received nuisance-trip parameter with the stored nuisance-trip parameter related to a power-reversal protection function by detecting a change in direction of a power flow in the DER meter data and coordinating the DER meter data and the collected DER meter data from the neighboring PS with the received nuisance-trip parameters of the protection system, to identify the nuisance-trip condition. The power-reversal protection function includes but is not limited to DER operation and other fault conditions. The protection microcontroller (212) further configured to decide whether to allow or avoid tripping the ETC (214) based on the comparison of the received nuisance-trip parameters and update the weighted output parameters of the HMLM (222) by a reinforced machine learning accordingly to implement the tripping decision in future.

Figure 3:
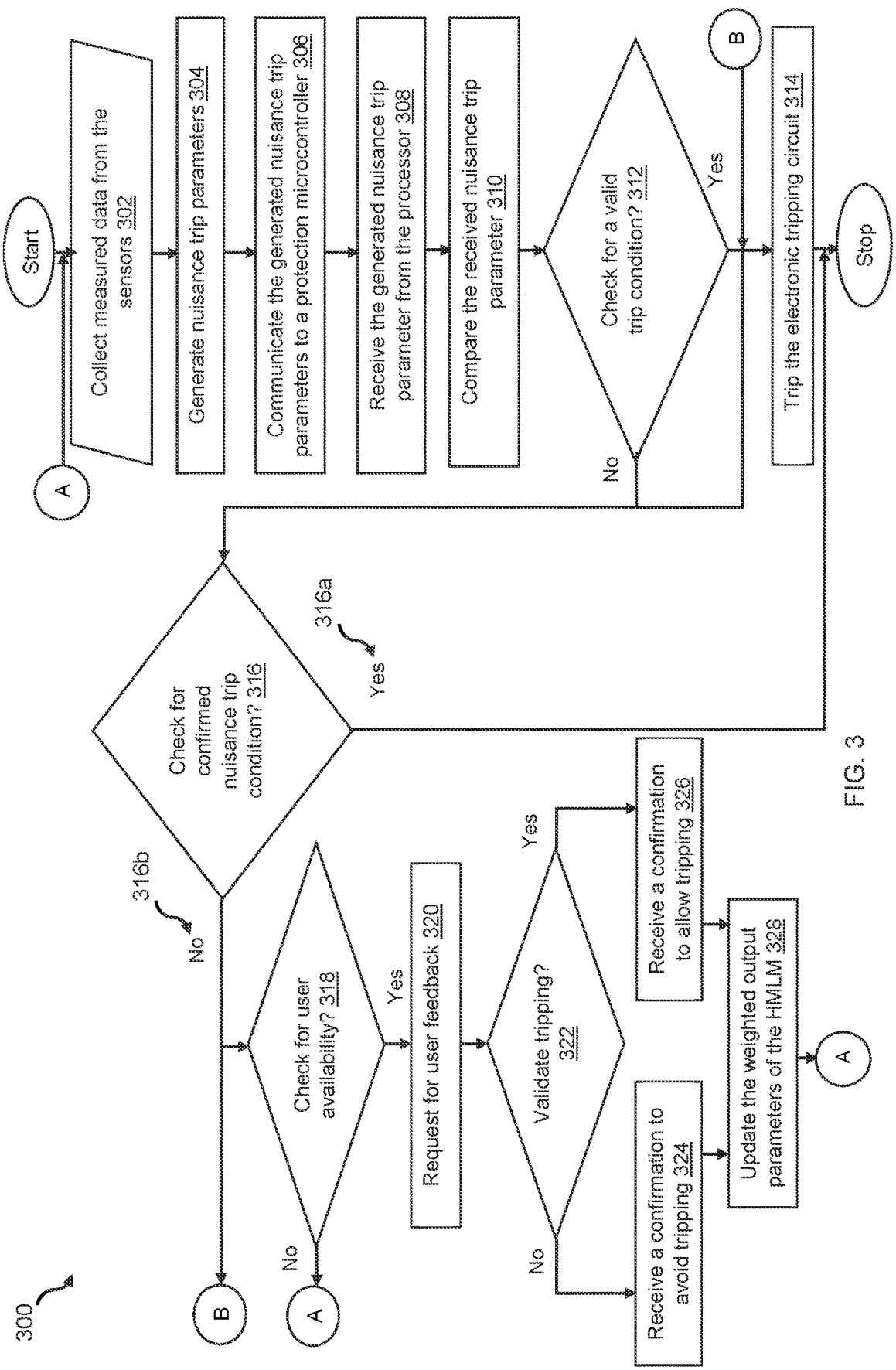
FIG. 3 illustrates a method performed by the protection system for nuisance-trip decision management in an electric power system using data analytics, according to a second aspect of an embodiment herein.

FIG. 3 illustrates a method (300) performed by the protection system for nuisance-trip decision management in an electric power system using data analytics, according to a second aspect of an embodiment. The methods that are illustrated in FIG. 4-FIG. 9, as a collection of operations in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be deleted from the methods without departing from the scope of the subject matter described herein. In the context of software, the operations represent computer instructions that, when executed by one or more processors, perform the recited operations.

According to the second aspect of an embodiment, the method (300) performed by the protection system for nuisance-trip decision management in the electric power system using data analytics comprising the steps of, storing, in a memory (208), an updated data of nuisance-tripping events and a plurality of decision parameters detected or generated on the electric power system over a period; performing, at a processor (210), hybrid machine learning (HML) based on the measured data from the plurality of sensors for a nuisance-trip condition and communicating with a neighboring protection system through LAN or central server/cloud via a communication interface.

According to the second aspect of an embodiment, the method (300) further comprising the steps of, at step 302, collecting, by the processor (210), a measured data from a plurality of sensors that includes a plurality of non-electrical parameters and electrical parameters sensors. The measured data includes a plurality of non-electrical parameters and electrical parameters. The plurality of non-electrical parameters and electrical parameters include but is not limited to ambient temperature, vibrations, electromagnetic interference (EMI) signal, voltage and current waveforms. The plurality of the sensors can be either located in the ETC or in an environment where switchgears are installed. The measurement of data from the sensors can be from the EPC or from the environment where switchgears are installed.

According to the second aspect of an embodiment, the method (300) further comprising the steps of, at step 304, generating, by the processor (210), a nuisance-trip parameter for a plurality of protection functions at a hybrid machine learning model (HMLM) (222) provided in the processor (210) based on the measured data using weighted output parameters thereby to identify the nuisance-trip condition that is mapped with a predefined list of a training data stored in the memory; The training data is updated to be utilized using a physics aware reinforced machine learning for field calibration; the plurality of protection functions includes but is not limited to a ground fault, an over current, a voltage, a frequency, an arc fault, a zone selective interlock (ZSI), a Reduced Energy Let Through (RELT), and a Power reversal; further, the training data is updated to be utilized for performing self-calibration of HMLM using physics aware reinforced machine learning based on the electronic, and mechanical component wear of the protection system (PS) (also related to the life of the PS) for automatic field calibration to ensure accurate calculation/generation of the nuisance trip parameters.

According to the second aspect of an embodiment, the method (300) further comprising the steps of, at step 306, communicating, by the processor (210) via the communication interface, the generated nuisance-trip parameter to a protection microcontroller (212) for allowing or avoiding tripping at least one electronic tripping circuit (ETC) (214) provided in at least one EPC (204); at step 308, receiving, by the protection microcontroller (212), the generated nuisance-trip parameter from the processor (210); at step 310, comparing, by the protection microcontroller (212), the received nuisance-trip parameter with a stored nuisance-trip parameter of the plurality of protection functions to identify the nuisance-trip condition; at step 312, checking, by the protection microcontroller, for the valid trip condition to make decision to allow or avoid tripping of the ETC; at step 314, deciding, by the protection microcontroller by allowing tripping the ETC (214) of the at least one EPC (204), if a valid trip condition of the ETC (214) is identified.

According to the second aspect of an embodiment, the method (300) further comprising the steps of, at step 316, checking, by the protection microcontroller, for the confirmed nuisance-tripping condition of the ETC; at step 316a, avoiding tripping the ETC (214) of the at least one EPC (204), if a confirmed nuisance-tripping condition of the ETC (214) is identified; at step 316b, allowing tripping the ETC (214) of the at least one EPC (204), if an unconfirmed nuisance-trip condition of the ETC (214) is identified; at step 318, checking, by the protection microcontroller, availability of a user/operator for validating the unconfirmed nuisance-trip condition; at step 320, requesting, by the protection microcontroller, a user feedback if the user is available; otherwise repeat the step 302 for collecting, by the processor (210), a measured data from the plurality of sensors.

According to the second aspect of an embodiment, the method (300) further comprising the steps of, at step 322, validating, by the user, the unconfirmed nuisance-trip condition, at step 324, receiving a confirmation from the user to avoid tripping the ETC (214), if the nuisance-trip condition is confirmed as a nuisance-trip by the user; at step 326, receiving a confirmation from the user to allow tripping the ETC (214), if the nuisance-trip condition is not confirmed as a nuisance-trip by the user; and at step 328, updating the weighted output parameters of the HMLM (222) by reinforced machine learning, based on the confirmation from the user to implement a tripping decision in future. Repeating the step 302 for collecting, by the processor (210), a measured data from a plurality of sensors after updating the weighted output parameters of the HMLM (222).

Figure 4:
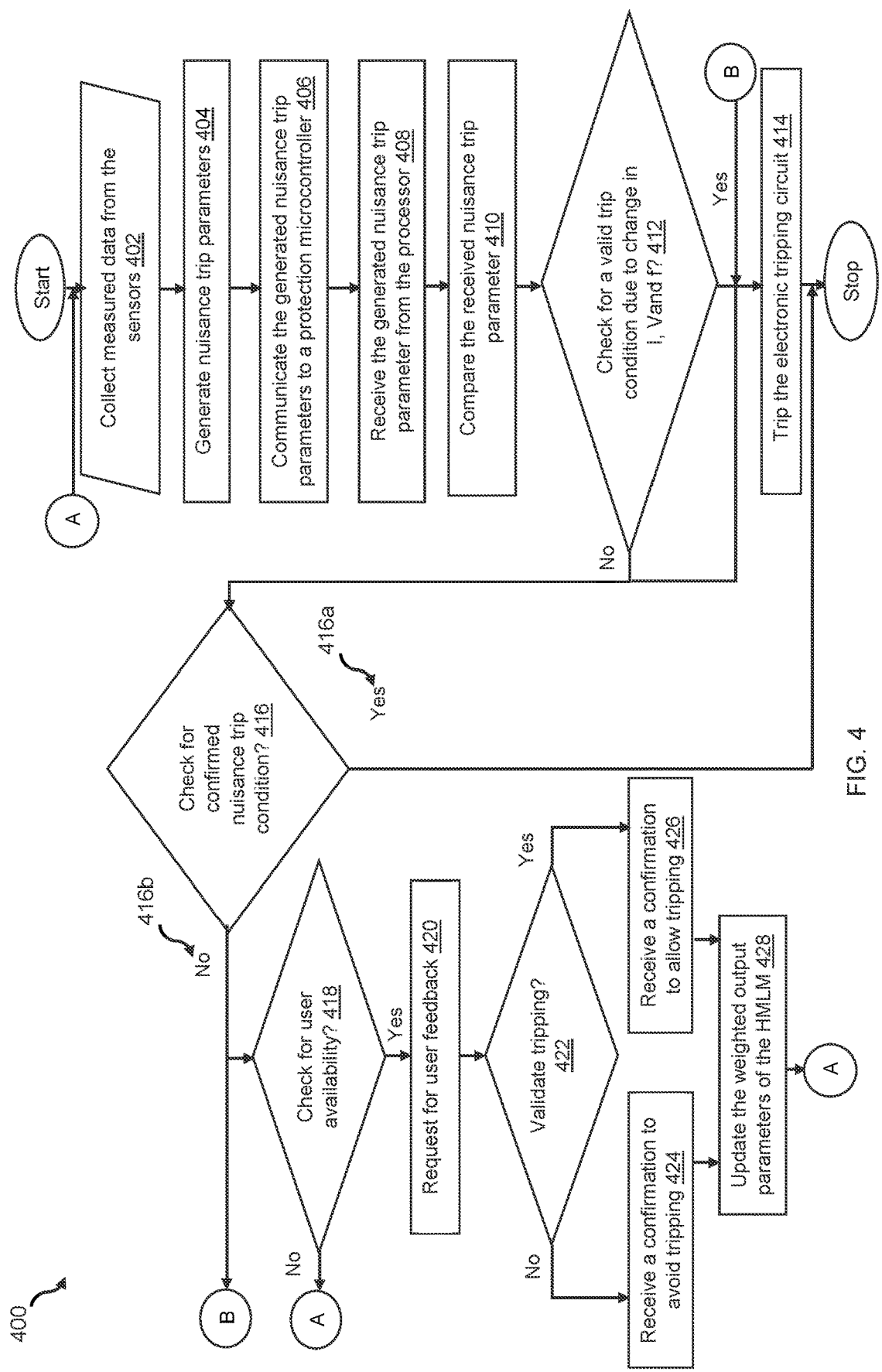
FIG. 4 illustrates a method performed by the protection system for nuisance-trip decision management related to voltage (V), current (I) and frequency (f), according to a second aspect of an embodiment herein.

FIG. 4 illustrates a method (400) performed by the protection system for nuisance-trip decision management related to voltage (V), current (I) and frequency (f), according to a second aspect of an embodiment. According to the second aspect of an embodiment, the steps performed by the PS from 302 to 310 and 316 to 328 of FIG. 3 are repeated same as that of steps performed by the PS from 402 to 410 and 416 to 428 of FIG. 4. According to the second aspect of an embodiment, the method performed by the protection system for nuisance-trip decision management related to voltage (V), current (I) and frequency (f) comprising the steps of, at step 412, checking, by the protection microcontroller, for the valid trip condition to make decision to allow or avoid tripping of the ETC by: correlating the received nuisance-trip parameters with a thermal data to identify the nuisance-trip condition related to the over current; and correlating the received nuisance-trip parameters with a per unit value of a change in voltage and a synchronous frequency value of the neighboring PSs that are connected with the protection system thereby to identify the nuisance-trip condition related to the voltage and frequency.

According to the second aspect of an embodiment, the method (400) further comprising the steps of, at step 414, deciding, by the protection microcontroller by allowing tripping the ETC (214) of the plurality of EPC (204), if a valid trip condition of the ETC (214) is identified. The voltage protection function includes but is not limited to under-voltage, over-voltage and phase loss of the PS (202). The frequency protection function includes but is not limited to under frequency and over frequency. The data analytics can coordinate with the neighboring breakers/protection systems for voltage protection. The voltage and frequency profiles are common and are synchronized in each electrical zone. This does not need a centralized controller and this nuisance trip management is completely decentralized or local to the protection systems.

Figure 5:
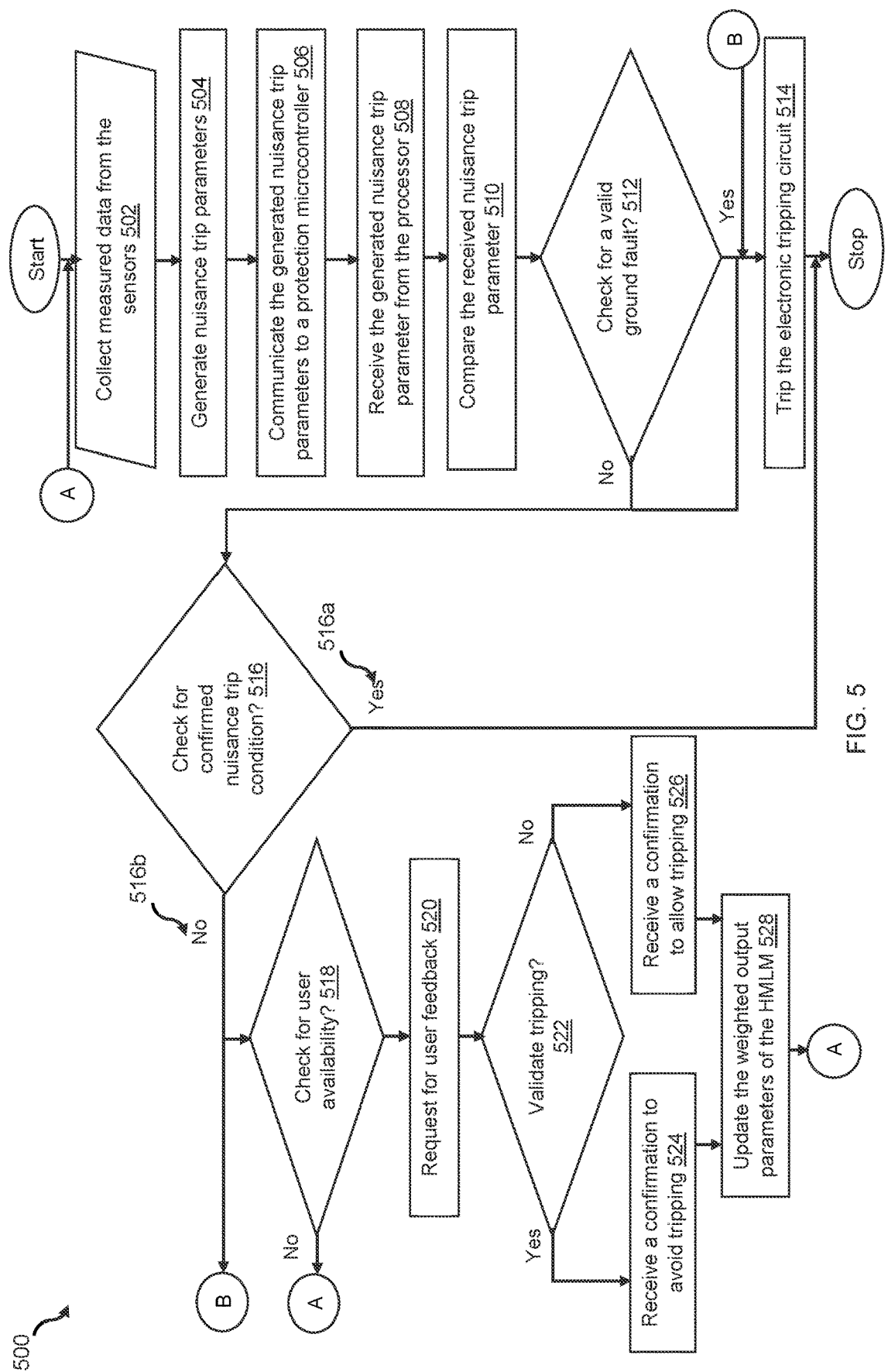
FIG. 5 illustrates a method performed by the protection system for nuisance-trip decision management related to a ground fault, according to a second aspect of an embodiment herein.

FIG. 5 illustrates a method (500) performed by the protection system for nuisance-trip decision management related to a ground fault, according to a second aspect of an embodiment. According to the second aspect of an embodiment, the steps performed by the PS from 302 to 310 and 316 to 328 of FIG. 3 are repeated same as that of steps performed by the PS from 502 to 510 and 516 to 528 of FIG. 5. According to the second aspect of an embodiment, the method performed by the protection system for nuisance-trip decision management related to ground fault (GF) comprising the steps of, at step 512, checking, by the protection microcontroller, for the valid trip condition to make decision to allow or avoid tripping of the ETC by sensing and categorizing events of the ground fault both in human and equipment protection, to identify the nuisance-trip condition.

According to the second aspect of an embodiment, the method (500) further comprising the steps of, at step 514, deciding, by the protection microcontroller by allowing tripping the ETC (214) of the plurality of EPC (204), if a valid trip condition of the ETC (214) is identified. The GF protection function includes but is not limited to GF Sum, differential GF protection, Multi-Source Ground-Fault, MSGF, and High Resistance Ground Fault, HRGF.

Figure 6:
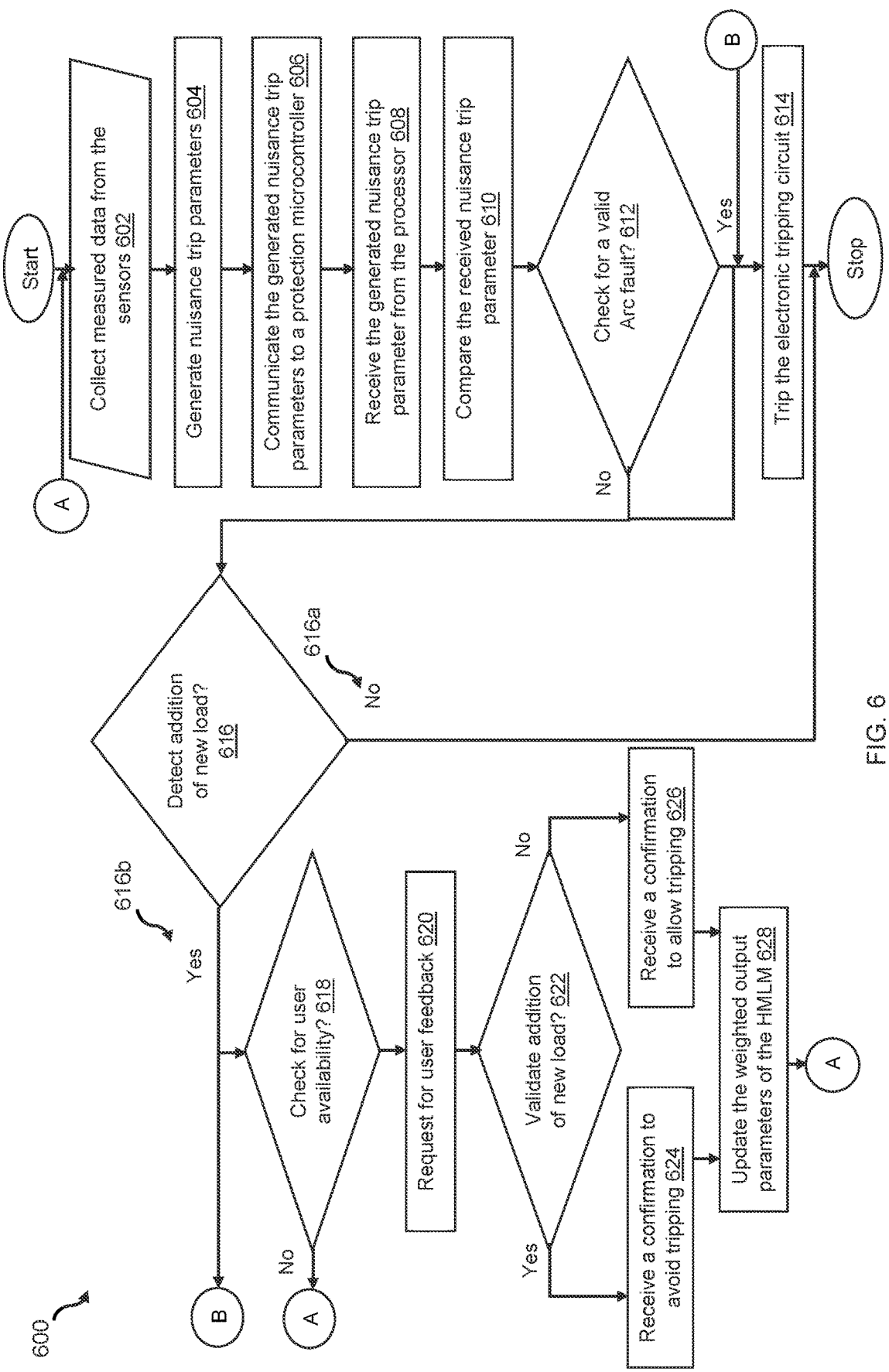
FIG. 6 illustrates a method performed by the protection system for nuisance-trip decision management related to an arc-fault, according to a second aspect of an embodiment herein.

FIG. 6 illustrates a method (600) performed by the protection system for nuisance-trip decision management related to an arc-fault, according to a second aspect of an embodiment. According to the second aspect of an embodiment, the steps performed by the PS from 302 to 310 and 318 to 328 of FIG. 3 are repeated same as that of steps performed by the PS from 602 to 610 and 618 to 628 of FIG. 6. According to the second aspect of an embodiment, the method (600) performed by the protection system for nuisance-trip decision management related to an arc-fault comprising the steps of, at step 612, checking, by the protection microcontroller, for the valid trip condition to make decision to allow or avoid tripping of the ETC by comparing the received nuisance-trip parameters with a load characterization and a load identification on each of the protection system, to identify the nuisance-trip condition; at step 614, deciding, by the protection microcontroller by allowing tripping the ETC (214) of the EPC (204), if a valid trip condition of the ETC (214) is identified.

According to the second aspect of an embodiment, the method (600) further comprising the steps of, at step 616, checking, by the protection microcontroller, for the confirmed nuisance-tripping condition of the ETC by detecting an addition of a new load; at step 616a, avoiding tripping the ETC (214) of the plurality of EPC (204), if there is no addition of the new load detected; at step 616b, allowing tripping the ETC (214) of the EPC (204), if there is an addition of the new load detected. The arc-fault protection function includes but is not limited to series arc faults and parallel arc faults.

Figure 7:
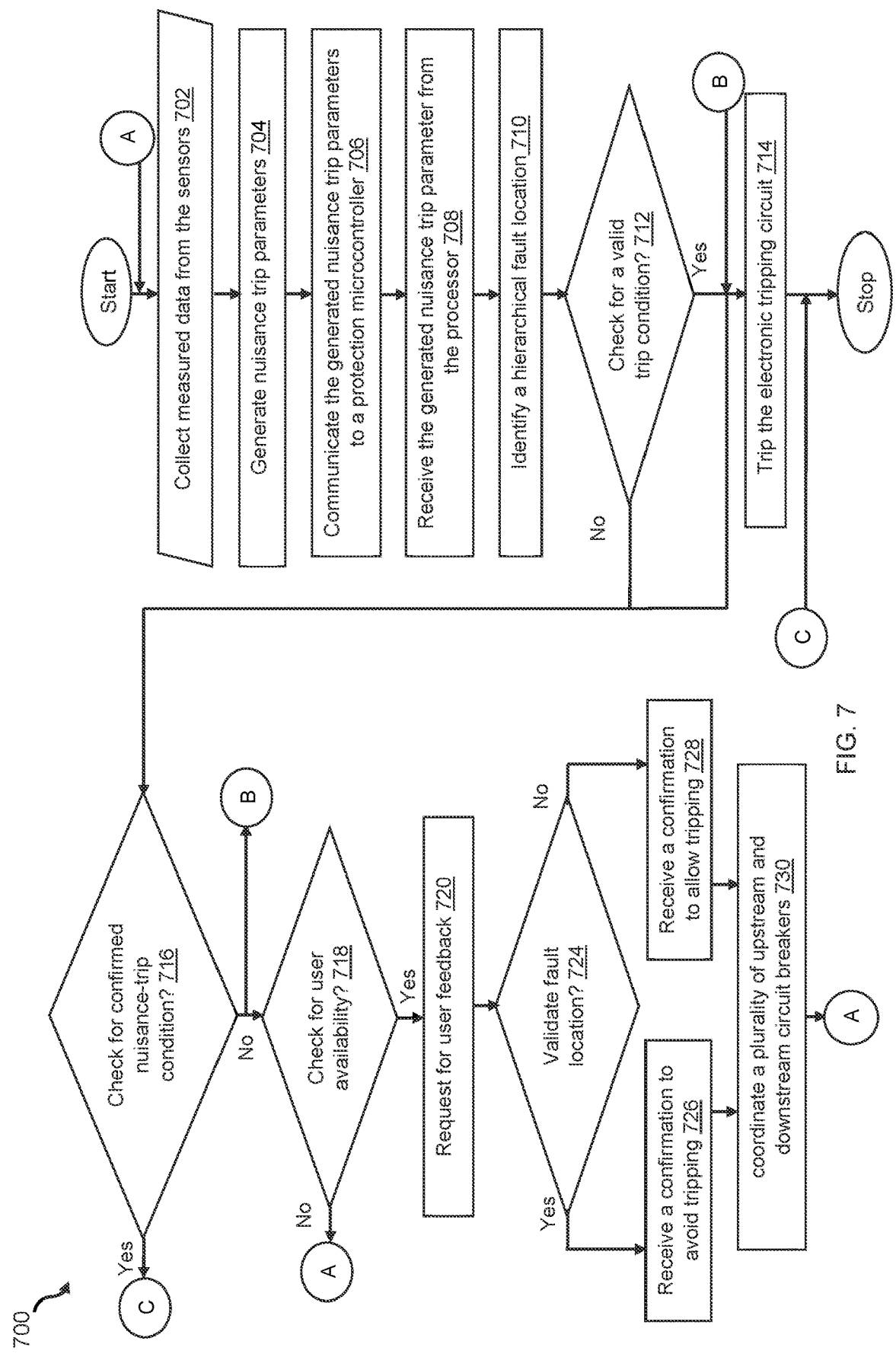
FIG. 7 illustrates a method performed by the protection system for nuisance-trip decision management related to a ZSI feature, according to a second aspect of an embodiment herein.

FIG. 7 illustrates a method (700) performed by the protection system for nuisance-trip decision management related to a ZSI feature, according to a second aspect of an embodiment. According to the second aspect of an embodiment, the steps performed by the PS from 302 to 308 of FIG. 3 are repeated same as that of steps performed by the PS from 702 to 708 of FIG. 7. According to the second aspect of an embodiment, the method performed by the protection system for nuisance-trip decision management related to a ZSI feature comprising the steps of, at step 710, identifying, by the protection microcontroller, a hierarchical location of fault/nuisance-trip through a ZSI feature along with the received nuisance trip parameter; at step 714, checking, by the protection microcontroller, for the valid trip condition to make decision to allow or avoid tripping of the ETC by the identified hierarchical fault.

According to the second aspect of an embodiment, the method (700) further comprising the steps of, at step 716, deciding, by the protection microcontroller by allowing tripping the ETC (214) of the EPC (204), if a valid trip condition of the ETC (214) is identified; at step 718, checking, by the protection microcontroller, for the confirmed nuisance-tripping condition of the ETC; at step 718a, avoiding tripping the ETC (214) of the EPC (204), if a confirmed nuisance-tripping condition of the ETC (214) is identified; at step 718b, allowing tripping the ETC (214) of the EPC (204), if an unconfirmed nuisance-trip condition of the ETC (214) is identified.

According to the second aspect of an embodiment, the method (700) further comprising the steps of, at step 720, checking, by the protection microcontroller, availability of a user/operator for validating the unconfirmed nuisance-trip condition; at step 722, requesting a user feedback if the user is available, by the protection microcontroller; otherwise repeat the step 302 for collecting, by the processor (210), the measured data from a plurality of sensors; at step 724, validating, by the user, the unconfirmed nuisance-trip condition; at step 726, receiving a confirmation from the user to avoid tripping the ETC (214), if the nuisance-trip condition is confirmed as a nuisance-trip by the user.

According to the second aspect of an embodiment, the method (600) further comprising the steps of, at step 728, receiving a confirmation from the user to allow tripping the ETC (214), if the nuisance-trip condition is invalid; and at step 730, coordinate a plurality of upstream and downstream circuit breakers. Repeating the step 302 for collecting, by the processor (210), a measured data from a plurality of sensors after coordinating the upstream and downstream circuit breakers. For example, in case of too much field noise either in upstream or downstream system then based on information exchange and hand shaking an appropriate device identification may happen for right-location trip management so that optimal electrical coverage is ensured during a fault condition. These along with the signals of flux-shifter malfunction and/or shunt-trip malfunction can be used for better trip management by sharing this information to the upstream or downstream breaker without the need for a centralized controller. The ZSI protection function includes but is not limited to communication of a component failure to upstream or downstream PS.

Figure 8:
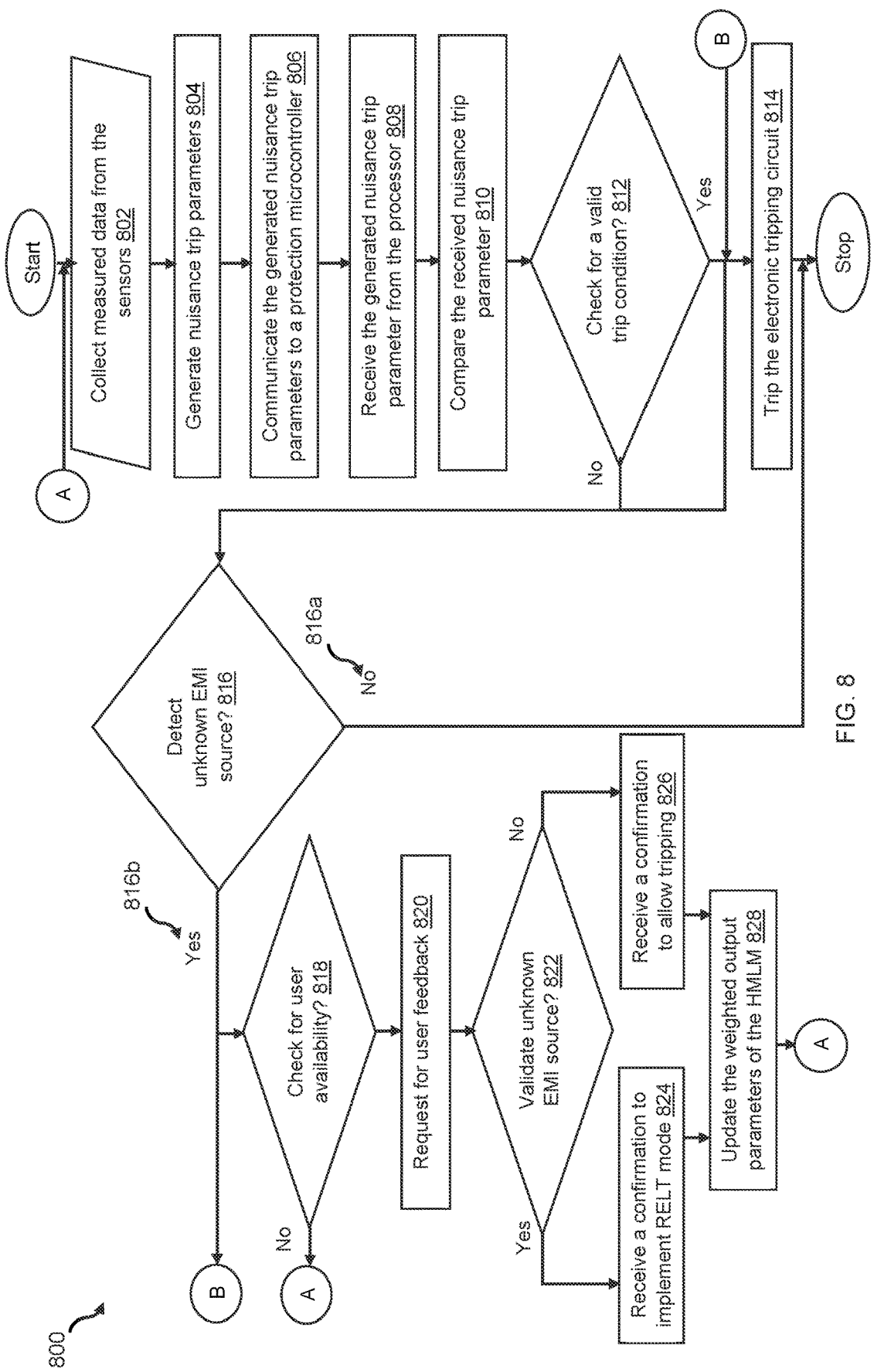
FIG. 8 illustrates a method performed by the protection system for nuisance-trip decision management related to a RELT feature, according to a second aspect of an embodiment herein.

FIG. 8 illustrates a method (800) performed by the protection system for nuisance-trip decision management related to a RELT feature, according to a second aspect of an embodiment. According to the second aspect of an embodiment, steps performed by the PS from 302 to 310 and 328 of FIG. 3 are repeated as same as that of steps performed by the PS from 802 to 810 and 828 of FIG. 8. According to the second aspect of an embodiment, the method performed by the protection system for nuisance-trip decision management related to a RELT feature comprising the steps of, at step 812, checking, by the protection microcontroller, for the valid trip condition to make decision to allow or avoid tripping the ETC by characterizing the EMI sources and a proximity of the EMI sources with the received nuisance-trip parameters of the protection system, to identify the nuisance-trip condition; at step 814, deciding, by the protection microcontroller by allowing tripping the ETC (214) of the plurality of EPC (204), if a valid trip condition of the ETC (214) is identified; at step 816, checking, by the protection microcontroller, for the confirmed nuisance-tripping condition of the ETC by detecting unknown EMI source; at step 816a, avoiding tripping the ETC (214) of the EPC (204), if there is a known EMI source detected; at step 816b, allowing tripping the ETC (214) of the EPC (204), if there is an unknown EMI source detected.

According to the second aspect of an embodiment, the method (800) further comprising the steps of, at step 818, checking, by the protection microcontroller, availability of a user/operator for validating the unknown EMI source; at step 820, requesting, by the protection microcontroller, a user feedback if the user is available; otherwise repeat the step 302 for collecting, by the processor (210), a measured data from a plurality of sensors; at step 822, validating, by the user, the unknown EMI source; at step 824, receiving a confirmation from the user to implement RELT mode of operation, if the unknown EMI source is confirmed as a known EMI source by the user; at step 826, receiving a confirmation from the user to allow tripping of the ETC, if the unknown EMI source is confirmed as an unknown EMI source by the user. The EMI sources are characterized at the customer-site/industrial premises to identify the known EMI source such as mobile phones, and any other wireless devices such as a walkie-talkie that are used within a coverage area. Further, the EMI characterization information from one customer site can help the breaker fleet/trip unit by sharing the EMI source characterization. This information can be used to develop a robust method to prevent nuisance trips. A field or On-site noise level analysis through real time data analytics improves proper management of the RELT feature in a switchgear and hence allows better safety and protection management. The RELT protection function includes but is not limited to the neighboring protection system under RELT and human detection through EMI source characterization.

Figure 9:
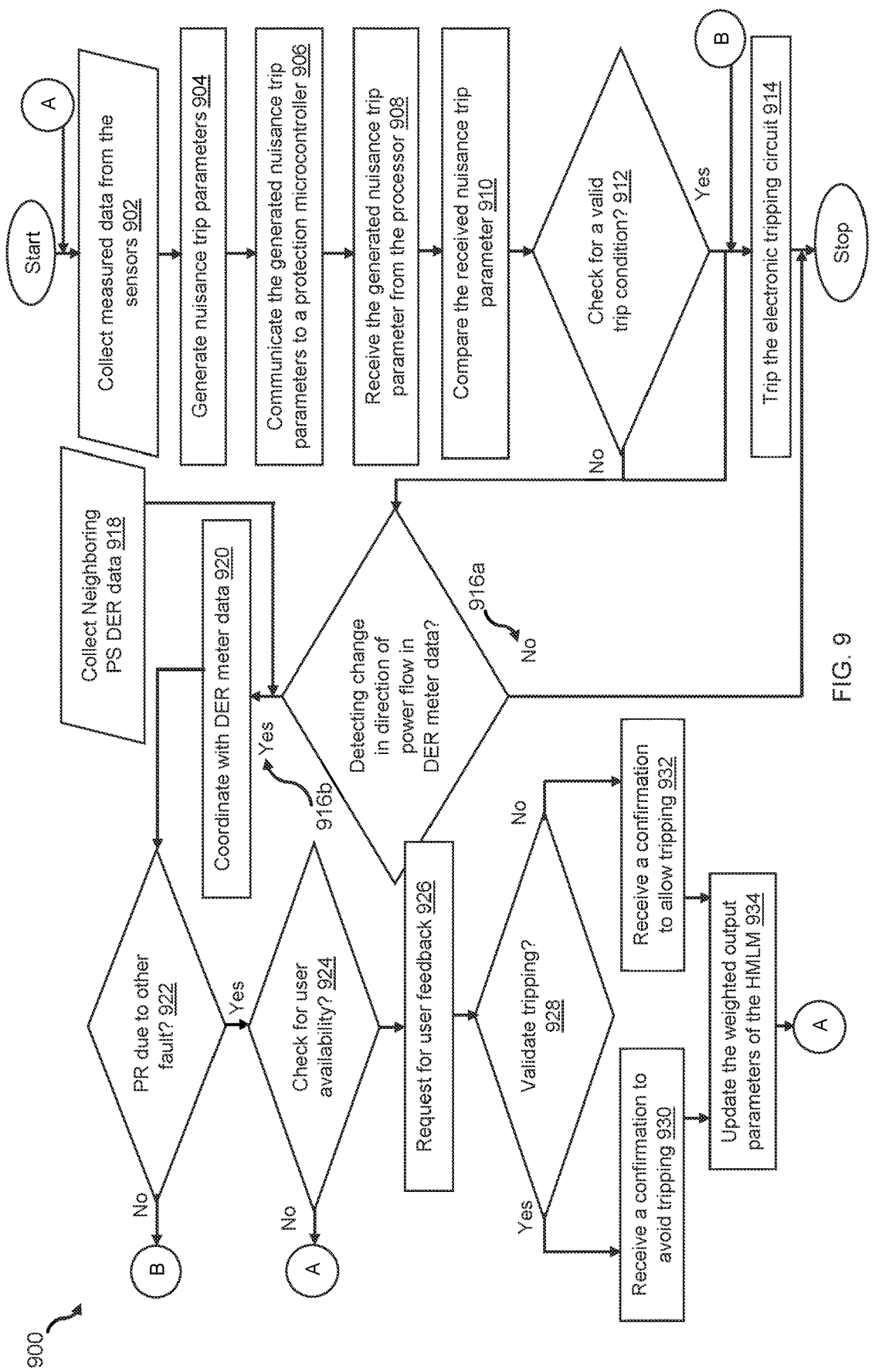
FIG. 9 illustrates a method performed by the protection system for nuisance-trip decision management related to a power-reversal in the electric power distribution system, according to a second aspect of an embodiment herein.

FIG. 9 illustrates a method (900) performed by the protection system for nuisance-trip decision management related to a power-reversal in the electric power distribution system, according to a second aspect of an embodiment. According to the second aspect of an embodiment, steps performed by the PS from 302 to 314 and 318 to 328 of FIG. 3 are repeated as same as that of steps performed by the PS from 902 to 914 and 924 to 934 of FIG. 9. According to the second aspect of an embodiment, the method performed by the protection system for nuisance-trip decision management related to the power-reversal further comprising the steps of, at step 916, detecting by the protection microcontroller, for a change in a direction of a power flow in a distributed energy resource (DER) meter data; at step 916a, avoiding tripping the ETC (214) of the EPC (204), if there is no change in the direction of a power flow in the DER meter data; at step 916b, allowing tripping the ETC (214) of the EPC (204), if there is a change in the direction of a power flow in the DER meter data.

According to the second aspect of an embodiment, the method (900) further comprising the steps of, at step 918, collecting, by the protection microcontroller, the DER meter data from the neighboring PS; at step 920, coordinating, by the protection microcontroller, the DER meter data and the collected DER meter data from the neighboring PS with the received nuisance-trip parameters of the protection system, to identify the nuisance-trip condition; at step 922, checking, by the protection microcontroller, for the power-reversal (PR) is due to other fault; if confirmed then request for user feedback; otherwise if the PR is identified not due to the other fault, then allow tripping the ETC (214) of the EPC (204). The power-reversal (PR) protection function includes but are not limited to DER operation and other fault conditions.

An advantage of the above mentioned system for nuisance-trip decision management in an electric power system using data analytics, improves performance of the protection devices/systems by upgrading the decision making capability of existing protection systems. Further, as the system utilizes cloud-based data analytics on the data that are collected from the neighboring PS, improves performance optimization and provides advanced protection schemes by understanding the device behavior under various operating. Further, the enhanced machine-learning when applied to the protection system, ensures optimized protection settings and tripping decisions. The lab environment in the form of digital replication of the field device helps easier design of future products resulting from the understanding of variables association for performance of the devices in field.

The system can be applied in Industrial Breakers/Panels to improve decision making to avoid nuisance trip under harsh & noisy EMI Environment. The Industrial Breaker can be operated without the need for much interrupters or filters incorporated in the electric power system. The Industrial Breaker with Automatic RELT Mode based on smart EMI sensing can be implemented and EMI Source Characterization based on Noise Classification for enhanced protection & personnel safety. Further, the system can be applied for residential and commercial breakers/load Centers to ensure smart load-characterization of branch circuits and avoid Nuisance Trip based on load characterization. The system with a hybrid-data-analytics model, analyzes and stores the reason for each unique nuisance trip event with the cause, which allows both self-learning and the user field report/feedback. This feature allows the user/customer to judge the changing field condition and required innovation or change or upgradation of the new product.

The foregoing description of the specific embodiments will so fully reveal the general nature of the embodiments herein that a person skilled in the art can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A system for nuisance-trip decision management in an electric power system using data analytics comprising:
   a protection system (PS) and at least one electrical protection circuit (EPC);
   wherein the PS comprises:
   a plurality of sensors configured to measure data from a plurality of non-electrical parameters and electrical parameters sensors; wherein the measured data includes a plurality of non-electrical parameters and electrical parameters that include ambient temperature, vibrations, electromagnetic interference (EMI) signal, voltage and current waveforms;
   a memory configured to store an updated data of nuisance-trip events and a plurality of nuisance-trip parameters of a plurality of protection functions detected or generated on the electric power system over a period;
   a processor configured to perform hybrid machine learning (HML) based on the measured data from plurality of sensors for a nuisance-trip condition and communicate with a neighboring protection system through Local Area Network (LAN), central server/cloud via a communication interface-1;
   a protection microcontroller configured to use the measured data from a plurality of electrical parameter sensors to identify an electrical fault and allow or avoid tripping at least one electronic tripping circuit provided in the at least one electronic protection circuit by communicating with the at least one EPC, the processor and the neighboring protection systems through the LAN or the central server via a communication interface-2;
   wherein the processor is further configured to:
   collect the measured data from the plurality of sensors;
   generate a nuisance-trip parameter for the plurality of protection functions at a hybrid machine learning model (HMLM) provided in the processor based on the measured data using weighted output parameters thereby to identify the nuisance-trip condition that is mapped with a predefined list of a training data stored in the memory;
   wherein the training data is updated to be utilized by a physics aware reinforced machine learning for field calibration; wherein the plurality of protection functions includes a ground fault, an over current, a voltage, a frequency, an arc fault, a zone selective interlock (ZSI), a Reduced Energy Let Through (RELT), and a Power reversal; and
   communicate the generated nuisance-trip parameter to the protection microcontroller for an intelligent nuisance-trip decision making via the communication interface-1;
   wherein the protection microcontroller is further configured to:
   receive the generated nuisance-trip parameter from the processor;
   compare the received nuisance-trip parameter with a stored nuisance-trip parameter of the plurality of protection functions to identify the nuisance-trip condition and decide to:

allow tripping an electronic tripping circuit (ETC) of the at least one EPC, if a valid trip condition of the at least one ETC is identified;

avoid tripping the ETC of the at least one EPC, if a confirmed nuisance-trip condition of the ETC is identified; and allow tripping the ETC of the at least one EPC, if an unconfirmed nuisance-trip condition of the ETC is identified and simultaneously request a user feedback to validate the unconfirmed nuisance-trip condition by:

receiving a confirmation from the user to allow or avoid tripping the ETC; and updating the weighted output parameters of the HMLM by reinforced machine learning, based on the confirmation from the user to implement a tripping decision in future.

2. The system as recited in claim 1, wherein the protection microcontroller is further configured to:

request the weighted output parameters for the generated nuisance-trip parameter, from the neighboring protection systems through the LAN, or any communication interface or the central server; and utilize an updated and deployed decision-making firmware or the weighted output parameters to calibrate the HMLM of the processor thereby to make a future tripping decisions in the PS.

3. The system as recited in claim 1, wherein the protection microcontroller is further configured to:

compare the received nuisance-trip parameter with the stored nuisance-trip parameter related to an over current protection function by correlating the received nuisance-trip parameters with a thermal data to identify the nuisance-trip condition; wherein the over current protection function includes over current;

decide to allow or avoid tripping the electronic tripping circuit based on the comparison of the received nuisance-trip parameters; and update the weighted output parameters of the HMLM by a reinforced machine learning accordingly to implement the tripping decision in future.

4. The system as recited in claim 1, wherein the protection microcontroller is further configured to:

compare the received nuisance-trip parameter with the stored nuisance-trip parameter related to a voltage and frequency protection function, by correlating the received nuisance-trip parameters with a per unit value of a change in voltage and a synchronous frequency value of the neighboring PSs that are connected with the protection system thereby to identify the nuisance-trip condition;

wherein the voltage protection function includes under-voltage, over-voltage and phase loss of the PS; and wherein the frequency protection function includes under frequency and over frequency;

decide to allow or avoid tripping the electronic tripping circuit based on the comparison of the received nuisance-trip parameters; and update the weighted output parameters of the HMLM by a reinforced machine learning accordingly to implement the tripping decision in future.

5. The system as recited in claim 1, wherein the protection microcontroller is further configured to:

compare the received nuisance-trip parameter with the stored nuisance-trip parameter related to a ground fault protection function by sensing and categorizing events of the ground fault both in human and equipment protection, to identify the nuisance-trip condition;

wherein the ground fault (GF) protection function includes GF Sum, differential GF protection, Multi-Source Ground-Fault (MSGF) and High Resistance Ground Fault (HRGF);

decide to allow or avoid tripping the electronic tripping circuit based on the comparison of the received nuisance-trip parameters; and update the weighted output parameters of the HMLM by a reinforced machine learning accordingly to implement the tripping decision in future.

6. The system as recited in claim 1, wherein the protection microcontroller is further configured to:

compare the received nuisance-trip parameter with the stored nuisance-trip parameter related to an arc fault protection function by comparing the received nuisance-trip parameters with a load characterization and a load identification on each of the protection system, to identify the nuisance-trip condition; wherein the arc fault protection function includes series arc faults and parallel arc faults;

decide to allow or avoid tripping the ETC based on the comparison of the received nuisance-trip parameters; and update the weighted output parameters of the HMLM by a reinforced machine learning accordingly to implement the tripping decision in future.

7. The system as recited in claim 1, wherein the protection microcontroller is further configured to:

manage the tripping decisions by identifying hierarchical location of fault/nuisance-trip through a ZSI feature along with the received nuisance trip parameter; wherein the ZSI protection function includes communication of a component failure to upstream or downstream Protection System;

decide to allow or avoid tripping the ETC at an appropriate location of the electric power system by selectively coordinating a plurality of upstream and downstream circuit breakers in the electric power system based on the comparison of the received nuisance-trip parameters.

8. The system as recited in claim 1, wherein the protection microcontroller is further configured to:

compare the received nuisance-trip parameter with the stored nuisance-trip parameter related to a RELT protection function by characterizing EMI sources and a proximity of the EMI sources with the received nuisance-trip parameters of the protection system, to identify the nuisance-trip condition; wherein the RELT protection function includes the neighboring protection system under RELT and human detection through EMI source characterization;

decide to allow tripping the ETC or to activate a RELT mode of operation in the protection microcontroller, based on the comparison of the received nuisance-trip parameters; and update the weighted output parameters of the HMLM by a reinforced machine learning accordingly to implement the tripping decision in future.

9. The system as recited in claim 1, wherein the protection microcontroller is further configured to:

collect a distributed energy resource (DER) meter data from the neighboring PS;

compare the received nuisance-trip parameter with the stored nuisance-trip parameter related to a power reversal protection function by detecting a change in direction of a power flow in the DER meter data and coordinating, the DER meter data and the collected DER meter data from the neighboring PS, with the received nuisance-trip parameters of the protection system, to identify the nuisance-trip condition; wherein the power reversal protection function includes DER operation and other fault conditions;

decide to allow or avoid tripping the ETC based on the comparison of the received nuisance-trip parameters; and update the weighted output parameters of the HMLM by a reinforced machine learning accordingly to implement the tripping decision in future.

10. A method performed by a protection system for nuisance-trip decision management in an electric power system using data analytics, comprising:

storing, in a memory, an updated data of nuisance-tripping events and a plurality of nuisance-trip parameters detected or generated on the electric power system over a period;

performing, at a processor, hybrid machine learning (HML) based on the measured data from a plurality of sensors for a nuisance-trip condition and communicating with a neighboring protection system through Local Area Network (LAN), central server/cloud via a communication interface;

collecting, by the processor, a measured data from the plurality of sensors that includes a plurality of non-electrical parameters and electrical parameters sensors; wherein the measured data includes a plurality of non-electrical parameters and electrical parameters that include ambient temperature, vibrations, electromagnetic interference (EMI) signal, voltage and current waveforms;

generating, by the processor, a nuisance-trip parameter for a plurality of protection functions at a hybrid machine learning model (HMLM) provided in the processor based on the measured data using weighted output parameters thereby to identify the nuisance-trip condition that is mapped with a predefined list of a training data stored in the memory;

wherein the training data is updated to be utilized using a physics aware reinforced machine learning for field calibration; wherein the plurality of protection functions includes a ground fault, an over current, a voltage, a frequency, an arc fault, a zone selective interlock (ZSI), a Reduced Energy Let Through (RELT), and a Power reversal; and communicating, by the processor, the generated nuisance-trip parameter to a protection microcontroller for allowing or avoiding tripping at least one electronic tripping circuit (ETC) provided in the at least one electrical protection circuit (EPC) via the communication interface;

receiving, by the protection microcontroller, the generated nuisance-trip parameter from the processor;

comparing, by the protection microcontroller, the received nuisance-trip parameter with a stored nuisance-trip parameter of the plurality of protection functions to identify the nuisance-trip condition and deciding to:

allow tripping the at least one ETC of the at least one EPC, in response to identifying a valid trip condition of the ETC; or avoid tripping the at least one ETC of the at least one EPC, in response to identifying a confirmed nuisance-tripping condition of the at least one ETC; and allow tripping the at least one ETC of the at least one EPC, if an unconfirmed nuisance-trip condition of the at least one ETC is identified and simultaneously requesting a user feedback for validating the unconfirmed nuisance-trip condition by:

receiving a confirmation from the user to allow or avoid tripping the at least one ETC; and updating the weighted output parameters of the HMLM by reinforced machine learning, based on the confirmation from the user to implement a tripping decision in future.

* * * * *